Sept. 26, 1967 E. MEDAL 3,343,863
GRAPPLE APPARATUS FOR REACTOR CORE COMPONENTS
Filed Nov. 4, 1965 3 Sheets-Sheet 2

Inventor
Einar Medal
By Forest C. Sexton
Attorney

Sept. 26, 1967        E. MEDAL        3,343,863

GRAPPLE APPARATUS FOR REACTOR CORE COMPONENTS

Filed Nov. 4, 1965        3 Sheets-Sheet 3

Inventor
Einar Medal
By Forest C. Sexton
Attorney

United States Patent Office 3,343,863
Patented Sept. 26, 1967

3,343,863
GRAPPLE APPARATUS FOR REACTOR CORE COMPONENTS
Einar Medal, Washington, D.C., assignor to Allis-Chalmers Manufacturing Company, Milwaukee, Wis.
Filed Nov. 4, 1965, Ser. No. 506,382
8 Claims. (Cl. 294—83)

This invention relates generally to a grapple apparatus for handling core components in a nuclear reactor. More specifically, this invention relates to a simple, fail-safe grappling mechanism which will easily and safely handle both the rectangular shaped fuel assemblies and the cruciform shaped control rods as are commonly employed jointly in a single nuclear power reactor.

The core of a typical nuclear power reactor usually comprises a plurality of elongated fuel assemblies and a plurality of elongated control rods all vertically disposed within a shroud. In boiling water reactors, the fuel assemblies are usually square in cross section and contain a nuclear fuel encased in tubes or plates, and allow water passage through the assembly adjacent to the encased fuel. The control rods on the other hand, usually comprise a solid neutron absorber and have a cruciform cross section. The shroud is a honeycomb type of structure having elongated openings therein of square and cruciform cross section to receive each individual fuel assembly and control rod. Within the core, each of the four blades of a cruciform control rod is fitted between some adjacent fuel assemblies such that various sets of four fuel assemblies, in a square array, are spaced apart into the four quadrants of the cruciform control rod.

During operation of the reactor, the fuel assemblies are usually held in position by a holddown structure placed over the shroud, while the control rods are secured to a driving mechanism which can raise or lower the control rods relative to the core to control the output of the reactor. When the reactor is being serviced, the holddown structure and control rod drive mechanism are removed so as to provide access to each individual fuel assembly and control rod through the openings in the top of the shroud. Thereafter, a grappling mechanism suspended from an overhead hoist or crane can be used to remove or insert a fuel assembly or control rod as desired.

In order to avoid damage to the fuel assemblies, control rods or shroud, and assure safety to the personnel servicing the reactor, the grapples commonly used are quite intricate in design and therefore expensive to manufacture. Furthermore, since the fuel assemblies and control rods usually have different cross-sectional forms, two different grapples must be provided which results in substantial difficulty and inconvenience when servicing such a reactor. That is to say, not one but two separate grapples or grappling mechanisms must be provided, one for handling fuel assemblies and one for handling control rods. Thus, since overhead space limitations usually provide only sufficient space for one overhead crane, the grapples must be frequently interchanged as the core components are extracted or inserted into the shroud.

In addition to the complexities resulting from the use of two grapple mechanisms, the critical tolerances and critical perfection that must be maintained in the fuel assemblies and control rods further complicates handling procedures, since extreme precautions must be taken to avoid the slightest damage to any of the core components. It is obvious therefore, that the operator must have special requirements of skill and judgment in handling the fuel assemblies and control rods to minimize the possibility of damage to any component.

This invention is predicated upon the development of a simple and unique universal grapple which can easily and safely handle both the rectangular fuel assemblies and cruciform control rods with a minimum possibility of damage to fuel elements, control rods and shroud.

Accordingly, it is a primary object of this invention to provide a new and improved universal grapple capable of handling fuel assemblies and control rods of different cross-sectional forms.

It is another primary object of this invention to provide a universal grapple for rectangular fuel assemblies and cruciform control rods which is self-aligning, which automatically engages and disengages the load within or outside the core, and which is self-locking to prevent premature loss of the load.

It is still another primary object of this invention to provide a universal grapple for rectangular fuel assemblies and cruciform control rods which is inexpensive, simple in operation, provide optimum safety to personnel, and assure a minimum of damage to control rods, fuel assemblies and shroud.

It is a further object of this invention to provide a universal grapple for rectangular fuel assemblies and cruciform control rods which is in part self-controlling and fail-safe to therefore relieve the operator from any special requirements of skill and judgment.

These and other objects and advantages are fulfilled by this invention as will become apparent from a full understanding of the following detailed description and accompanying drawings of which:

Figure 1:
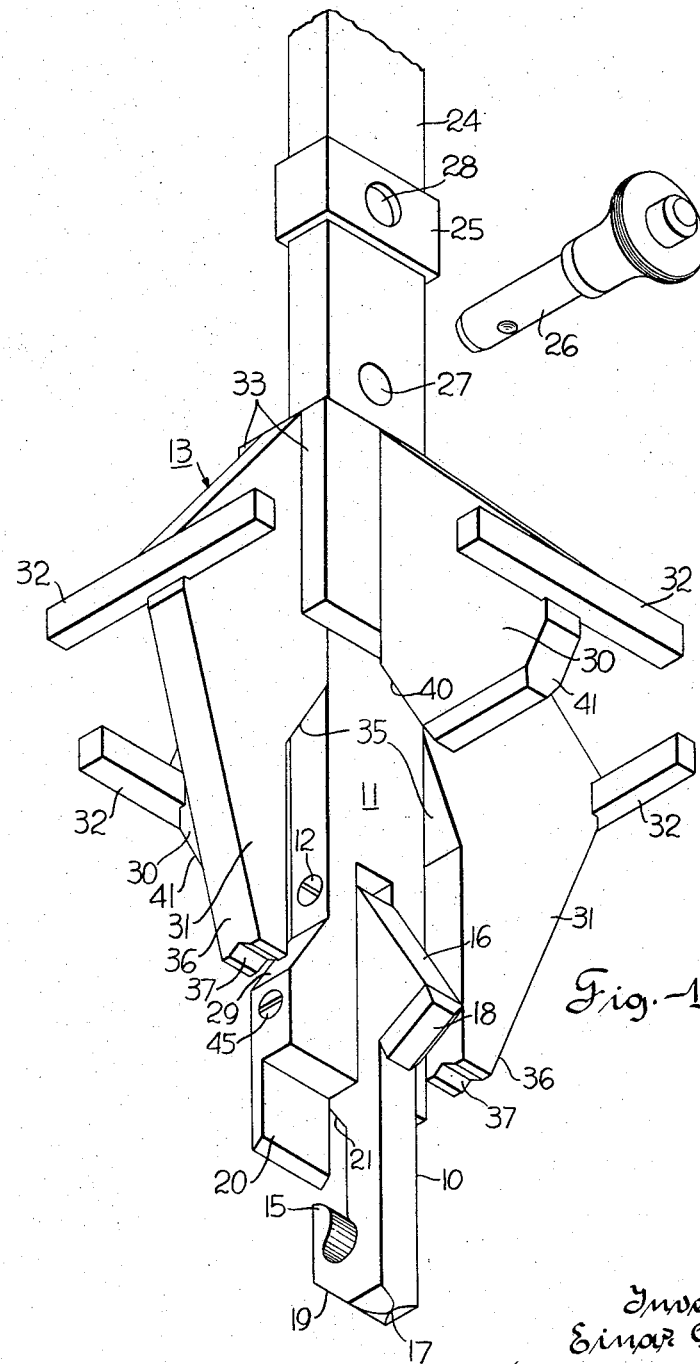
FIG. 1 is a perspective view of a preferred embodiment of a universal grapple constructed in accordance with this invention.
Figure 3:
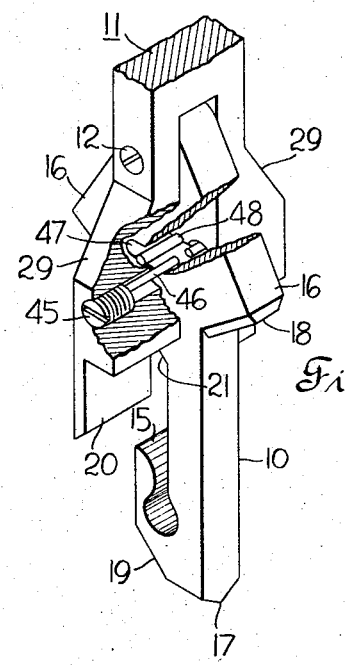
FIG. 3 is a cutaway perspective view showing the detent mechanism in detail.

Referring to the drawings and particularly to FIG. 1, one preferred embodiemnt of this invention comprises a grapple pivot 10 pivotally suspended from an elongated slide bar 11 by a pivot shaft 12, and a cruciform shaped sliding weight structure 13 slidably mounted onto the slide bar 11. A detent mechanism (FIG. 3) secured in part within the grapple pivot 10 and slide bar 11 can be actuated to lock the grapple pivot 10 in an open or inoperative position. The upper end of the slide bar 11 is releasably secured to a hoist cable (not shown) so that the entire grapple mechanism hangs suspended therefrom.

The grapple pivot 10 comprises a hook 15 at the lower end thereof and a pair of shoulders 16 extending downwardly beyond the edge of slide bar 11. The extreme lower tip 17 of grapple pivot 10 and the undersurface 18 of shoulders 16 may be beveled or angled as shown to provide "lead-in" surfaces to facilitate entry of the grapple pivot 10 into the cruciform openings of a shroud. The undersurface 19 of grapple pivot 10 immediately below the hook 15 and forward of tip 17 is angled to provide the hook with a self-engaging characteristic. The undersurface 21 directly above the hook 15 is also angled to provide a self-disengaging characteristic.

The slide bar 11 is further provided with an elongated body portion 24 having a rectangular cross section over which the sliding weight structure 13 can slide. A slide stop block 25 and pin 26 can be secured to the rectangular body portion 24 at either of the two holes 27 and 28 to limit the downward sliding action of the slide bar 11 relative to the sliding weight structure 13. The lower end of slide bar 11 is wider than the body portion 24 to provide shoulders 29 which limit the upward sliding action of slide bar 11 relative to the sliding weight structure 13. A thin tongue portion or grapple lock 20 extends downward from the lower forward edge of the slide bar 11 which serves in part to close the opening on to hook 15. The lower edge of grapple lock 20 is beveled or angled, as shown, so that it may be guided over the handle on a fuel assembly or control rod.

Figure 2:
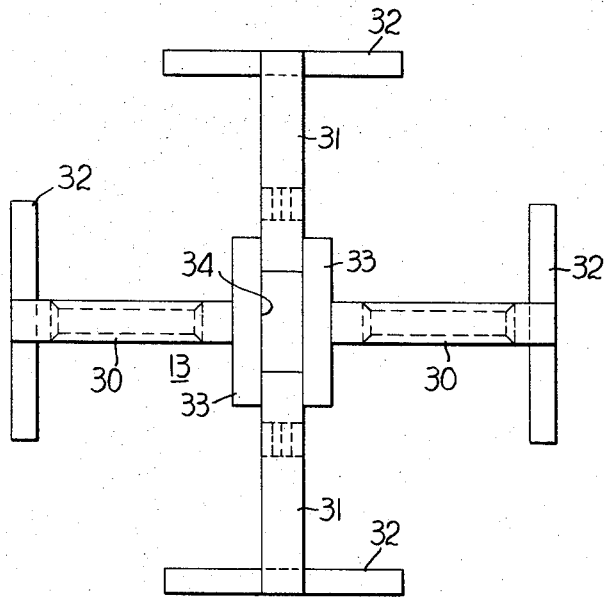
FIG. 2 is a top view of the sliding weight structure portion of the grapple shown in FIG. 1.

The sliding weight 13 comprises a pair of short blades 30 and a pair of long blades 31 rigidly secured in a cruciform configuration, and four rest blocks 32 secured perpendicularly at the outer edges of blades 30 and 31 in a square configuration (FIG. 2). As shown in FIG. 2, the two long blades 31 are secured between two small rectangular plates 33 to form a rectangular opening 34 having the same cross-sectional dimensions as rectangular body portion 24 of slide bar 11. The short blades 30 are secured perpendicularly to the two plates 33. The sliding weight 13 is mounted onto the slide bar 11 by fitting the opening 34 over the body portion 24 on slide bar 11.

With reference back to FIG. 1, the lower inside portion of the long blades 31 are contoured to fit over shoulders 29 on slide bar 11 so that surfaces 35 on blades 31 will come to rest against shoulders 29 to stop the relative downward motion of the sliding weight structure 13. The lower outside surfaces 36 of the two long blades 31 are angled inwardly, as shown, to provide "lead-in" surfaces to facilitate entry of blades 31 into the square openings of a shroud, thus providing a self-centering characteristic of the sliding weight 13 over the square opening. The extreme lower edge of the two long blades 31 are provided with notches 37 to brace against the lifting handles of fuel assemblies or control rods when pickup or setdown is effected outside of the shroud. The extreme lower edges of blades 31 may be further beveled or angled (not shown) adjacent to notches 37 to provide "lead-in" surfaces for cruciform shaped shroud openings.

Figure 6:
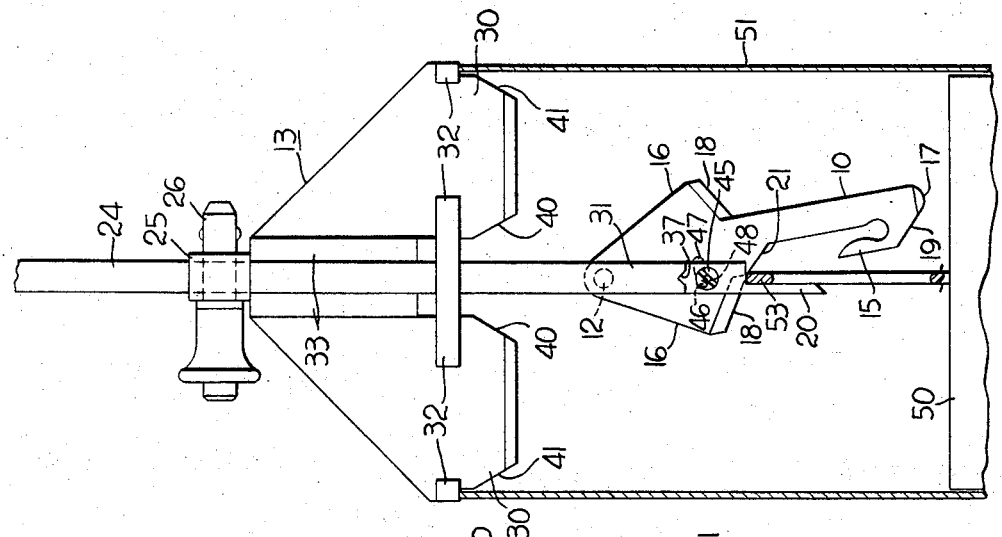
FIG. 6 is a view similar to FIG. 5 but showing the detent mechanism engaged so as to disengage the fuel assembly.
Figure 5:
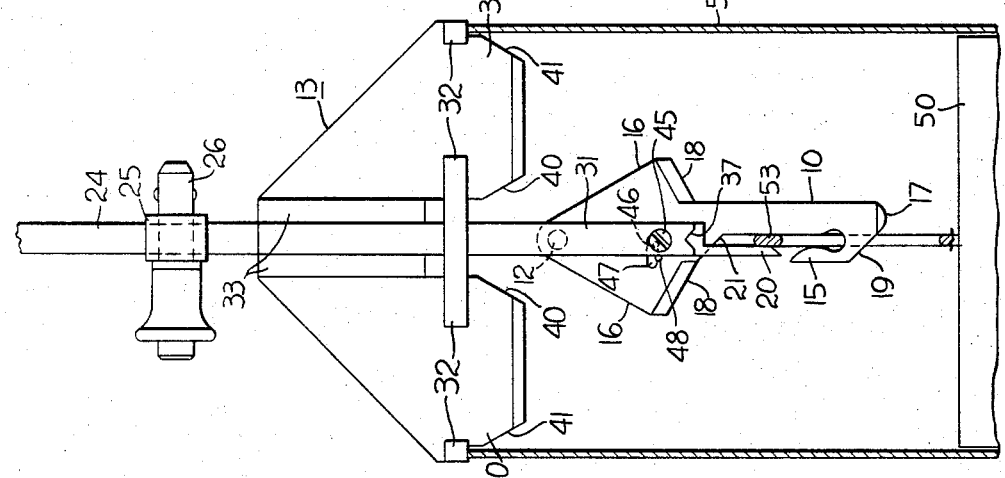
FIG. 5 is a view similar to FIG. 4 but showing the sliding weight structure resting against the shroud with the fuel assembly engaged.

The lower inside surface 40 of the two short blades 30 are angled outwardly so that these surfaces 40 rest against shoulders 16 on grapple pivot 10 when surfaces 35 on the long blades 31 are at rest on shoulders 29 on slide bar 11. The lower outer surface 41 on the two short blades are angled similarly to the lower outer surfaces 36 on blades 31 to provide similar "lead-in" surfaces for centering the sliding weight 13 over square shroud openings. To assure proper centering, the total width of each pair of blades, measured just under each pair of opposing rest blocks 32, must be sufficient to allow a close fit within the square or rectangular openings in the shroud, as shown in FIGS. 5 and 6. The extreme lower edge of the two short blades 30 and long blades 31 may be angled or beveled to provide "lead-in" surfaces for cruciform shaped shroud openings.

The grapple pivot 10 and slide bar 11 are jointed by the pivot shaft 12 in a generally cruciform configuration. That is, in an end view the long width of one crosses the long width of the other perpendicularly at the center. The cruciform configuration of the sliding weight 13 is directly coincident over the cruciform configuration of the grapple pivot 10 and slide bar 11. Thus, the entire lower portion of the grapple apparatus can be lowered into the cruciform openings in a shroud, to assume proper centering thereover.

The detent mechanism (FIG. 3) comprises a pair of threaded members 45, each having an eccentric pin 46 on the end thereof, threaded into the slide bar 11 so that the eccentric pins 46 enter an oval shaped hole 47 through grapple pivot 10. A hump or hardened pin 48 is provided on the wall of hole 47 toward the forward edge of grapple pivot 10 in such a manner that when the grapple pivot 10 is pivoted rearwardly through a predetermined arc length on pivot shaft 12, the pin 48 coacts with pins 46 to hold the grapple pivot 10 in a disengaging, open position. The pins 46 should have some flexibility so they are not broken when pin 48 is forced under them. Since pins 46 are a part of threaded member 45, they are adjustable by proper turning of members 45. Since similar detent mechanisms are well known in various mechanical arts, it should be understood that any detent mechanism could be utilized within the scope of this invention. The detent mechanism shown is therefore exemplary.

Figure 4:
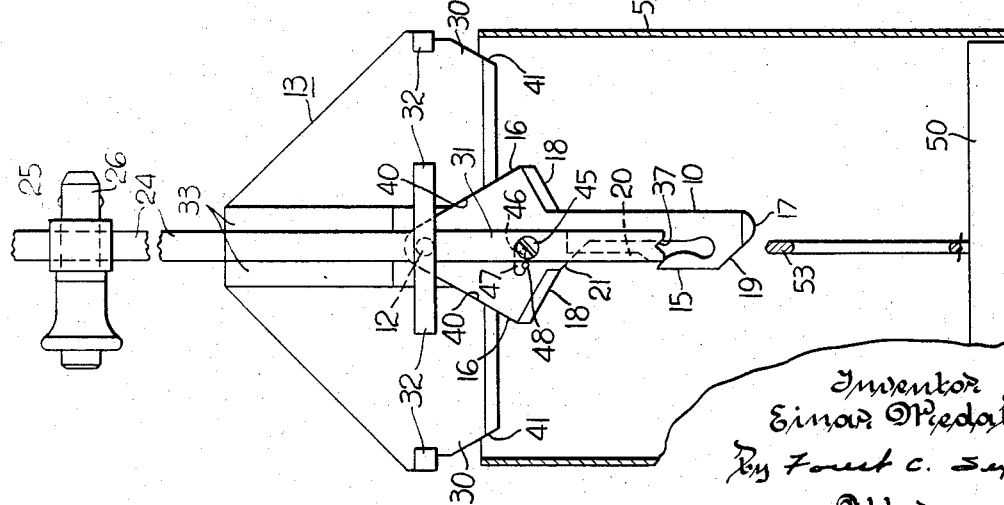
FIG. 4 is a side view of the grapple suspended from a hoist above a shroud, shown in section, and fuel assembly.

The operation of the grapple is illustrated in FIGS. 4, 5 and 6. In operation, the grapple is suspended from a hoist cable (not shown), and thus the grapple is actuated through proper manipulation of the hoist (not shown). When the grapple is suspended from the hoist cable, the force of gravity will cause the sliding weight structure 13 to be in its most downward position, relative to the slide bar 11, with surfaces 35 and 40, on blades 31 and 30 respectively, resting on shoulders 29 and 16 respectively (FIG. 4).

To extract a fuel assembly 50 from a reactor core, the grapple is lowered over the fuel assembly 50 and shroud 51 as shown in FIG. 4. Surfaces 36 and 41 on blades 31 and 30 respectively, will guide against the upper edges of the shroud to center the grapple directly over the fuel assembly 50 until rest blocks 32 come to rest on the edges of shroud 51. With the sliding weight structure 13 resting squarely and centered on the shroud opening (FIG. 5), the slide bar 11 and grapple pivot 10 are further lowered into the opening so that shoulders 29 and 16 no longer bear the weight of the sliding weight structure 13. The lowering proceeds until the lower angled surface 19 on grapple pivot 10 comes in contact with the fuel assembly handle 53. Further lowering causes the grapple pivot 10 to be pivotally deflected by the action of surface 19 on handle 53 and move down the side of handle 53 until the grapple pivot 10 can swing back erect with hook 15 directly under the handle 53. At the same time, grapple lock 20 guides downwardly along the other side of handle 53 to assure alignment of the grapple thereover, and prevent the grapple pivot 10 from forcing the fuel assembly sideways against the shroud. The lowering motion is preferably stopped automatically at this point by a limit switch on the cable hoist drum (not shown). This switch is triggered when the exact cable length is payed out. The hoist is then actuated to lift the slide bar 11 and grapple pivot 10 upward whereby hook 15 engages handle 53. As lifting progresses, the grapple pivot 10 pulls the entire fuel assembly upward until shoulders 29 and 16 come into contact with surfaces 35 and 40. Upon further lifting, the entire grapple mechanism is lifted, with surfaces 40 resting against shoulders 16 to prevent any pivotal action of grapple pivot 10. At the same time, grapple lock 20 closes the opening of hook 25 to prevent any premature release of the load.

To place a fuel assembly into the reactor core, a similar but reverse procedure is followed. The grapple and fuel assembly are first vertically aligned over the opening which is to receive the fuel assembly. Sliding weight structure 13, in its most downward position, securely braces grapple pivot 10 by virtue of surfaces 40 on shoulders 16. As the entire system is lowered, surfaces 36 and 41 on blades 31 and 30, respectively, serve to center the grapple directly over the opening and seat the sliding weight structure 13 on the top edge of the shroud 51. As lowering continues, the fuel assembly 51 and grapple pivot 10 move downward away from the sliding weight 13 so that the grapple pivot 10 is no longer secured thereby. Shortly after the fuel element reaches bottom (FIG. 5) the limit switch (as for fuel element removal) stops the down travel. To effect release of the grapple an override of the switch provides further down travel until surface 21 on grapple pivot 10 comes in contact with the top of the fuel assembly handle 53. Upon further lowering, the grapple pivot 10 is forced aside by the action of surface 21 on handle 53, until the detent mechanism is engaged to hold the grapple pivot 10 in this disengaging open position (FIG. 6). The stop block 25 and pin 26 should be so positioned on the slide bar 11 as to prevent further down travel to avoid damaging the detent mechanism and fuel assembly. With the detent mechanism holding grapple pivot 10 in an inoperative position, up travel of the slide bar 11 and grapple pivot 10 can be commenced without re-engaging handle 53 with hook 15. Once grapple pivot 10 is lifted clear of handle 53 further up travel causes shoulders 16 to be pulled between surfaces 40 and thus the grapple pivot 10 is forced back to the normal position disengaging the detent mechanism. Thus the detent mechanism is both engaged and disengaged automatically.

It should now be clear that the action or force of surfaces 40 on shoulders 16 serves a dual purpose. First, as noted immediately above, the action of surfaces 40 on shoulders 16 will disengage the detent mechanism as the grapple pivot 10 is withdrawn from the shroud after inserting a fuel assembly or control rod to restore the pivot 10 to its operative position. Second, as noted previously, the sliding weight 13 rests upon shoulders 16 to brace the grapple pivot 10 preventing any pivotal action which could cause any premature loss of the load. Surfaces 35 on shoulders 29 only serve to prevent the entire weight of the sliding weight 13 from acting on the grapple pivot 10 to thus prevent excessive stresses on the pivot shaft 12.

The procedure for removing and inserting the cruciform shaped control rods is the same as for fuel assemblies. In handling control rods however, surfaces 36 and 41 on blades 31 and 30, respectively, serve no purpose. Rather, the beveled or angled lower edges of grapple pivot 10 and blades 30 and 31 serve to guide the grapple into the cruciform openings. The blades 30 and 31 partially extending down into the cruciform opening will automatically center the grapple over the cruciform opening. Accordingly, rest blocks 32 come to rest perpendicularly across the narrow openings. If the control rod handle has a depth which is different from the depth of the fuel assembly handle 53, it will be necessary to provide additional holes, such as holes 27 and 28 in slide bar 11, to accommodate for the necessary different down travel limitations.

Basically, the same procedure as described above is followed when the load, fuel assembly or control rod is set down or picked up from locations outside the reactor core. That is, for set down the entire system is lowered until the load comes to rest upon a surface. In this case however, there is no shroud to stop the downward motion of sliding weight 13. Instead, further down travel causes notches 37, on long blades 31, to come to rest upon the load handle 53 to stop down travel of the sliding weight 13, while grapple pivot 10 is lowered away from handle 53. Continued down travel then lowers the grapple pivot 10 away from the sliding weight 13 so that eventually it will be forced aside by the action of surface 21 on the handle 53, so that the detent mechanism engages to hold the grapple pivot 10 in a disengaging open position. Grapple lock 20 will serve to prevent the slide bar from being deflected and prevent the grapple pivot 10 from tipping the load over. To raise the grapple mechanism away from the load deposited outside of the core, some modified procedures must be followed. In this situation, the sliding weight 13 is resting on the load and not on the shroud. Therefore, the surfaces 40 acting on shoulders 16 during up travel will tend to disengage the detent mechanism and close the grapple pivot 10 before it is clear of handle 53. Therefore, some means must be provided for lifting the sliding weight 13 to prevent premature disengagement of the detent mechanism. This can be done manually or a stop block and pin (not shown) can be then positioned on slide bar 11 below sliding weight 13, to cause the sliding weight 13 to be lifted with the slide bar 11 and prevent surfaces 40 from acting on shoulders 16 to close the grapple pivot 10.

To pick up a load not positioned with a shroud, the reverse procedure must be followed. That is, the sliding weight 13 must be lifted clear of the grapple pivot 10 either manually, or by a stop block and pin (not shown) as described above. The grapple is then lowered over the load deflecting grapple pivot 10 until notches 37 come to rest upon the load handle 53. The sliding weight 13 is then released or the stop block and pin (not shown) removed. Further lowering will cause the hook 15 to be positioned below handle 53. Lifting the slide bar 11 and grapple pivot 10 will then cause shoulders 16 to lift the sliding weight 13 off of the load handle 53 and cause hook 15 to engage the handle and lift the load.

If casks are to be provided to contain the fuel assemblies and control rods when outside of the core, then it would probably be desirable to construct the casks with tolerances and depths the same as the shroud. Therefore, the grapple could function on the casks the same as it does on the shroud.

It should be apparent from the drawings that the entire grapple mechanism is extremely easy to manufacture. No special castings are required. All the components, except for the pivot shaft, pins and the like, can be easily cut and machined from a single piece of plate steel. The gauge or thickness of the steel plate is not too critical. However, since the grapple pivot 10, the lower portion of the slide bar 11, and the lower portions of blades 30 and 31 must easily slide into the cruciform shaped openings, the thickness of the steel members will be limited by the size of the cruciform openings. Preferably, the tolerance should be reasonably close to optimize the self-centering characteristics of the grapple.

It may be further apparent that numerous modifications and additional features could be made and incorporated into the embodiment of the grapple detailed above, without departing from the basic concepts of this invention. For example, it may be desirable to make the body portion 24 with two separate pieces joined by a pivot shaft so as to provide a pivot point. Such a pivot might be necessary in some situations where it may be desired to set down or pick up a load at a point not directly under the hoist. It may also be desirable to reinforce the blades 30 and 31 by providing some bracing means therebetween at some points no lower than the rest blocks 32. Further, the rest blocks 32 could be joined at the ends to form a complete square, or could be replaced by other bracing designs but having the same characteristic insofar as resting the sliding weight 13 on the shroud. As noted above, a great number of variations could be employed in the detent mechanism. Other modifications could be provided as particular circumstances at any particular site might require.

It should also be noted that this invention is not limited for use only with reactors having square shaped fuel elements and cruciform shaped control rods. That is, this grapple could be modified to practically any shape of fuel assembly and control rods by merely modifying the blade configuration in the sliding weight and the "lead-in" surfaces thereon.

Accordingly, it should be understood that this invention should not be limited to the details given herein, but may be modified within the scope of the appended claims.

The embodiments of the invention in which an exclusive property or privilege is claimed are defined as follows:

1. A grapple apparatus for loading fuel assemblies and control rods into and out of openings within a reactor core shroud, comprising in combination a grapple pivot pivotally suspended from the end of an elongated vertically disposed slide bar, said grapple pivot having means thereon for pivotally engaging and disengaging the ends of said fuel assemblies and control rods, a sliding weight structure slidably mounted onto said slide bar for vertical sliding movement relative thereto, said sliding weight structure in its most downward position relative thereto resting against said grapple pivot to hold said grapple pivot in an operative position to prevent any pivotal action, and support means on said sliding weight structure to engage said shroud when the lower end of the grapple is lowered into said shroud openings so that the grapple pivot and slide bar will slide downward relative thereto releasing said sliding weight from engagement against the grapple pivot so that said grapple pivot can pivotally engage and disengage the fuel assemblies and control rods.

2. The apparatus as described in claim 1 including means on said grapple pivot to coact with the top of said fuel assemblies and control rods causing said grapple pivot to pivot and automatically engage and disengage said fuel assemblies and control rods.

3. The apparatus as described in claim 2 including a detent means for holding the grapple pivot in a disengaging position when said grapple pivot has been pivoted through a predetermined arc.

4. The apparatus as described in claim 3 including means on said sliding weight structure for inactivating said detent means returning said grapple pivot to an engaging position when said grapple pivot is raised out of the shroud opening and engaged against said sliding weight structure.

5. The apparatus as described in claim 4 including lead-in surfaces on the underside of said sliding weight structure as will cause said sliding weight structure to be centered over said openings in said shroud.

6. A grapple apparatus for loading rectangular shaped fuel assemblies and cruciform shaped control rods into and out of rectangular shaped and cruciform shaped openings respectively within a reactor core shroud structure, comprising in combination a grapple pivot pivotally suspended from the lower end of an elongated vertically disposed slide bar, said grapple pivot having a hook thereon for pivotally self-engaging and self-disengaging the ends of said fuel assemblies and control rods, detent means for holding the grapple pivot in a disengaging open position when said grapple pivot has been pivoted through a predetermined arc, a sliding weight structure slidably mounted onto said slide bar above said grapple pivot for vertical sliding movement relative thereto, support means on said sliding weight structure to engage the shroud when the grapple pivot is lowered into said shroud openings so that said grapple pivot and slide bar can slide downward relative thereto for engagement and disengagement of said fuel assemblies and said control rods, and support means on said grapple pivot to support said sliding weight structure when raised away from the shroud, and to disengage said detent means returning said grapple pivot to the engaging position when said grapple pivot and slide bar are lifted out of a shroud opening.

7. The apparatus as described in claim 6 including lead-in surfaces on the underside of said sliding weight structure to cause said sliding weight structure to be centered over the shroud openings as the grapple is lowered thereinto.

8. The apparatus as described in claim 7 wherein said sliding weight structure comprises a generally cruciform shaped body, the lower portion thereof insertable into the cruciform shaped openings in said shroud.

References Cited
UNITED STATES PATENTS 2,085,012  6/1937  Dixon _____ 294—83
3,167,345  1/1965  Dukes _____ 294—83

HUGO O. SCHULZ, *Primary Examiner.*

GERALD M. FORLENZA, *Examiner.*

G. F. ABRAHAMS, *Assistant Examiner.*